(12) United States Patent
Pekarek et al.

(10) Patent No.: US 8,018,193 B1
(45) Date of Patent: Sep. 13, 2011

(54) TORQUE RIPPLE MITIGATION CONTROLLER WITH VIBRATION SENSOR DELAY COMPENSATION

(75) Inventors: Steven D. Pekarek, West Lafayette, IN (US); Philip B. Beccue, Clayton, OH (US)

(73) Assignee: Purdue Research Foundation, West Lafayette, IN (US)

( * ) Notice: Subject to any disclaimer, the term of this patent is extended or adjusted under 35 U.S.C. 154(b) by 693 days.

(21) Appl. No.: 11/952,999

(22) Filed: Dec. 7, 2007

Related U.S. Application Data (60) Provisional application No. 60/868,990, filed on Dec. 7, 2006, provisional application No. 60/869,140, filed on Dec. 8, 2006.

(51) Int. Cl.
*G05B 5/01* (2006.01)
(52) U.S. Cl. .......... 318/611; 318/44; 318/623; 318/629; 318/400.15; 318/400.23; 318/432
(58) Field of Classification Search ................. 318/611, 318/623, 629, 44, 400.15, 400.23, 432
See application file for complete search history.

(56) References Cited

U.S. PATENT DOCUMENTS

| 4,245,181 A | 1/1981 | Plunkett |
| 4,358,696 A | 11/1982 | Liu et al. |
| 4,649,331 A | 3/1987 | Jahns |
| 4,814,677 A | 3/1989 | Plunkett |
| 4,920,306 A | 4/1990 | Mard et al. |
| 6,674,262 B2 * | 1/2004 | Kitajima et al. ............ 318/722 |
| 7,026,779 B2 * | 4/2006 | Eba ............................ 318/609 |
| 2006/0097594 A1 | 5/2006 | Abou-Akar et al. |

FOREIGN PATENT DOCUMENTS

WO     WO 2004/070918 A1     8/2004

OTHER PUBLICATIONS

H. Le-Huy, R. Perret, R. Feuillet, "Minimization of Torque Ripple in Brushless DC Motor Drives," *IEEE Transactions on Industry Applications*, vol. 22, No. 4, pp. 803-813, Jul./Aug. 1986.
C. Kang, I. Ha, "An Efficient Torque Control Algorithm for BLDCM With A General Shape Back-EMF," *PESC Record-Power Electronics Specialists Conference*, 1993, pp. 451-457.
D. C. Hanselman, "Minimum Torque Ripple, Maximum Efficiency Excitation Of Brushless Permanent Magnet Motors," *IEEE Transactions on Industrial Electronics*, vol. 41, No. 3, pp. 292-300, Jun. 1994.
R. Leidhold, G. Garcia, and E. Watanabe, "PMAC Motor Control Strategy, Based On The Instantaneous Active and Reactive Power, For Ripple-Torque and Copper-Losses Minimization," *IEEE Proceedings from the Industrial Electronics Society Conference*, Oct. 2000, pp. 1401-1405.
S. Park, H. Park, M. Lee, and F. Harashima, "A New Approach for Minimum-Torque Ripple Maximum-Efficiency Control Of BLDC Motor," *IEEE Transactions on Industrial Electronics*, vol. 47, No. 1, pp. 109-114, Feb. 2000.

(Continued)

*Primary Examiner* — Lincoln Donovan
*Assistant Examiner* — Erick Glass
(74) *Attorney, Agent, or Firm* — William F. Bahret (57) ABSTRACT

An enhanced torque ripple mitigation algorithm for permanent magnet synchronous machines (PMSMs), the algorithm including compensation for sensor delay.

27 Claims, 9 Drawing Sheets

OTHER PUBLICATIONS

C. D. Angelo, G. Bossio, G Garcia, J. Solsona, M. I. Valla, "Sensorless Speed Control Of Permanent Magnet Motors With Torque Ripple Minimization," *IEEE Proceedings from the Industrial Society Annual Conference*, Nov. 2002, pp. 680-685.

P. L. Chapman, S. D. Sudhoff, C. A. Whitcomb, "Optimal Current Control Strategies For Surface-Mounted Permanent-Magnet Synchronous Machine Drivers," *IEEE Transactions on Energy Conversion*, vol. 14, No. 4, pp. 1043-1050, Dec. 1999.

A. Wu and P. Chapman, "Cancellation of Torque Ripple Due to Nonidealities Of Permanent Magnet Synchronous Machine Drives," *IEEE Proceedings from the Power Electronics Specialist Conference*, Jun. 2003, pp. 256-261.

J. Holtz and L. Springob, "Identification and Compensation of Torque Ripple in High-Precision Permanent Magnet Motor Drives," *IEEE Transactions on Industrial Electronics*, vol. No. 2, pp. 309-320, Apr. 1996.

S. Chen, A. Song, and T. Sekiguchi, "High Efficiency and Low Torque Ripple Control Of Permanent Magnet Synchronous Motor Based On The Current Tracking Vector Of Elecromotive Force," *IEEE Proceedings from the Industrial Applications Conference*, Oct. 2000, pp. 1725-1729.

J. Hung and Z. Ding, "Design Of Currents To Reduce Torque Ripple In Brushless Permanent Magnet Motors," *IEEE Proceedings Part B from Electric Power Applications*, vol. 140, No. 4, pp. 260-266, Jul. 1993.

S. Clenet, Y. Lefèvre, N. Sadowski, S. Astier, and M. Lajoie, "Compensation Of Permanent Magnet Motors Torque Ripple By Means Of Current Supply Waveshapes Control Determined By Finite Element Method," *IEEE Transactions on Magnetics*, vol. 29, No. 2, pp. 2019-2023, Mar. 2003.

T. Liu, I. Husain, and M. Elbuluk, "Torque Ripple Minimization With On-Line Parameter Estimation Using Neural Networks In Permanent Magnet Synchronous Motors," *IEEE Proceedings from the Industry Applications Conference*, Oct. 1998, pp. 35-40.

T. S. Low, K. J. Tseng, T. H. Lee, K. W. Lim, and K. S. Lock, "Strategy For The Instantaneous Torque Control Of Permanent-Magnet Brushless Dc Drives," *IEEE Proceedinsg Part B from Electric Power Applications* vol. 137, No. 6, Nov. 1990, pp. 355-363.

N. Matsui, T. Makino, and H. Satoh, "Autocompensation Of Torque Ripple Of Direct Drive Motor By Torque Observer," *IEEE Transactions on Industry Applications*, vol. 29, No. 1, pp. 187-194, Jan./Feb. 1993.

T. Low, T. Lee, K. Tseng, and K. Lock, "Servo Performance Of a BLDC Drive With Instantaneous Torque Control," *IEEE Transactions on Industrial Applications*, vol. 28, No. 2, pp. 455-462, Mar./Apr. 1992.

G. Ferretti, G. Magnani, and P. Rocco, "Torque Ripple Adaptive Rejection In Brushless Motors," *IEEE/ASME Proceedings from the International Conference on Advanced Intelligent Mechatronics*, Sep. 1999, pp. 329-334.

F. Colamartino, C. Marchand, and A. Razek, "Considerations Of Non-Sinusoidal Field Distribution In a Permanent Magnet Synchronous Motor Control," *IEEE Proceedings from the Power Electronics and Variable-Speed Drives Conference*, Oct. 1994, pp. 508-513.

S. Li, Z. Zhizhong, and L. Yongping, "Compensation Of Ripple Torque Of Inverter-Fed PM Synchronous Motors," *IEEE Proceeding from the American Control Conference*, Jun. 2000, pp. 1597-1601.

F. Parasiliti, R. Petrella, M. Tursini, "Torque Ripple Compensation In Permanent Magnet Synchronous Motors Based On Kalman Filter," *IEEE Proceedings from International Industrial Electronics*, Jul. 1999, pp. 1333-1338.

F. Colamartino, C. Marchand, and A. Razek, "Torque Ripple Minimization In a Permanent Magnet Synchronous Servodrive," *IEEE Transactions on Energy Conversion*, vol. 14, No. 3, pp. 616-621, Sep. 1999.

O. Bogosyan, M. Gokasan, and A. Sabanovic, "Robust-Adaptive Linearization With Torque Ripple Minimization For a PMSM Driven Single Link Arm," *IEEE Proceedings from the International Conference on Industrial Electronics, Control, and Instrumentation*, Nov. 1997, pp. 102-107.

V. Petrovic, R. Ortega, A. M. Stankovic, and G. Tadmor, "Design and Implementation Of An Adaptive Controller For Torque Ripple Minimization In PM Synchronous Motors," IEEE Transactions on Power Electronics, vol. 15, No. 5, pp. 871-880, Sep. 2000.

W. Qian, S. Panda, and J. Xu, "Torque Ripple Minimization In PM Synchronous Motors Using Iterative Learning Control," IEEE Transactions on Power Electronics, vol. 19, No. 2, pp. 272-279, Mar. 2004.

T. Su, S. Hattori, M. Ishida, T. Hori, "Suppression Control Method For Torque Vibration Of AC Motor Utilizing Repetitive Controller With Fourier Transform," *IEEE Transactions on Industry Applications*, vol. 38, No. 5, pp. 1316-1325, Sep./Oct. 2002.

P. Beccue, J. Neely, S. Pekarek, D. Stutts, "Utilization of a Piezoelectric Polymer To Sense Harmonics Of Electromagnetic Torque," *IEEE Power Electronics Letters*, vol. 1, No. 3, pp. 69-73, Sep. 2003.

P. Beccue, J. Neely, S. Pekarek, D. Stutts, "Measurement and Control Of Torque Ripple-Induced Frame Torsional Vibration In a Surface Mount Permanent Magnet Machine," *IEEE Transactions on Power Electronics*, vol. 20, No. 1, pp. 182-191, Jan. 2005.

K. A. Corzine, S. D. Sudhoff, "A Hybrid Observer For High Performance Brushless DC Motor Drives," *IEEE Transaction on Energy Conversion*, vol. 11, No. 2, pp. 318-323, Jun. 1996.

S. Pekarek, P. Beccue, "Using Torque-Ripple Induced Vibration To Determine The Initial Rotor Position Of a PM Synchronous Machine," *IEEE Transactions on Power Electronics*, vol. 21, No. 3, May 2006, pp. 818-821.

* cited by examiner

TORQUE RIPPLE MITIGATION CONTROLLER WITH VIBRATION SENSOR DELAY COMPENSATION

CROSS-REFERENCE TO RELATED APPLICATIONS

This application claims the benefit of U.S. Provisional Patent Application No. 60/868,990, filed Dec. 7, 2006, and Application No. 60/869,140, filed Dec. 8, 2006.

GOVERNMENT RIGHTS

This invention was made with government support under N00024-02-C-4056 with the Naval Sea Systems Command. The government has certain rights in the invention.

BACKGROUND OF THE INVENTION

This invention relates to electric motor controls, and more particularly to devices and methods for mitigation of torque ripple in an electric motor.

Torque ripple created by permanent magnet synchronous machines (PMSM) is an issue in numerous applications. Traditionally, approaches to mitigate torque ripple have focused upon one of two methods. In the first, mitigation is achieved through machine design (i.e. adjusting magnet/tooth/slot geometry, etc). In the second, harmonics of stator current are controlled to minimize torque ripple. The focus of the research presented herein is on control-based mitigation techniques.

For the purposes of discussion it is convenient to place previous efforts on control-based mitigation in three categories. In [1-17] the parameters of a machine are used to derive stator excitation that minimizes torque ripple (or minimizes subject to constraints such as maximizing efficiency, a fixed dc-link voltage, etc.). More specifically, in [1-6] stator current waveforms are derived using knowledge of the stator back-emf. The ripple from cogging torque is neglected. In [7-13] the ripple from cogging torque is included in the derivation of the respective controls. In [14-17], mechanical parameters of the machine/load (i.e. the moment of inertia and damping coefficient) are used as part of a torque ripple estimator. Detected fluctuations in rotor position are used to estimate torque ripple.

Despite the documented success of the proposed methods, a shortcoming of the schemes proposed in [1-17] is the need for precise knowledge of machine parameters. This limits their applicability to low-volume (custom) applications. To reduce dependence on machine parameters, a second category of mitigation schemes employ parameter estimation techniques. Specifically, in [18-23] measurements of stator current and voltage are used to estimate the back-emf coefficients that are used to establish stator current harmonics. It is noted that the ripple due to cogging torque is not considered in the schemes of [18-23].

Most recently, measurement feedback has been used to provide closed-loop control. Specifically, in [24], a closed-loop torque ripple mitigation scheme is proposed that uses a torque transducer to provide feedback. In [25-26], torque ripple induced vibrations/noise are used for feedback. Specifically, in [25], an accelerometer/microphone is used to provide vibration/noise feedback for mitigating the effects of cogging torque for a PMSM with a sinusoidal back-emf. In [26], a feedback-based method is established to control torque ripple in machines with an arbitrary back-emf and cogging torque. In addition, a lower-cost vibration sensor is used in lieu of an accelerometer.

The techniques of [24-26] represent an advance toward applying control based mitigation methods in mass-produced drives where appreciable variation in machine parameters is expected. As the cost of computing power continues to decrease, such techniques may represent a viable alternative (or a complimentary approach) to machine design-based methods. Despite their promise, a barrier to widespread use of these and nearly all documented control-based torque ripple mitigation schemes has been their reliance on high-precision position encoders. Stated another way, with the exception of [6], all ripple control schemes have been validated using high precision position encoders. In [6], a back-emf detection scheme is proposed to establish rotor position. However, neither the position observer nor the torque ripple mitigation control were demonstrated in hardware. Moreover, the techniques proposed in [6] require precise knowledge of machine parameters.

SUMMARY OF THE INVENTION

The invention is particularly applicable to the control of vibration or noise caused by torque ripple in permanent magnet synchronous machines (PMSMs). In one embodiment, an algorithm is provided which compensates for a sensor delay associated with the sensing of torque ripple indirectly using a vibration sensor. The algorithm is an improvement on a ripple control algorithm disclosed in U.S. Pat. No. 7,117,754 to Neely et al., entitled Torque Ripple Sensor and Mitigation Mechanism, which patent is incorporated herein by reference.

As one aspect of the invention, a Hall-effect-sensor-based position observer is developed for use within a torque ripple control algorithm to provide encoderless feedback-based torque ripple mitigation. The position observer includes a routine to compensate for offset in placement of Hall sensors, which is shown to be necessary for effective control of torque harmonics.

The overall torque ripple mitigation strategy using an embodiment of the Hall-effect-based position observer has been validated in simulation and hardware using a 3-phase, 12-pole, 1 slot/pole/phase machine with a non-sinusoidal back-emf. Prior to mitigation, the torque ripple resulting from cogging and stator/rotor field interaction is on the order of 1-2 Nm (compared to a rated torque of 13 Nm). After the mitigation strategy is implemented, the torque ripple is less than 30 mNm. The proposed position observer reduces the cost required to implement torque ripple mitigation control and therefore makes significant progress toward the use of excitation-based strategies to achieve vibration/noise mitigation in large volume applications.

The objects and advantages of the present invention will be more apparent upon reading the following detailed description in conjunction with the accompanying drawings.

DESCRIPTION OF PREFERRED EMBODIMENTS

For the purpose of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated device and such further applications of the principles of the invention as illustrated therein being contemplated as would normally occur to one skilled in the art to which the invention relates.

I. Measurement and Mitigation of Torque Ripple Induced Vibration

Figure 1:
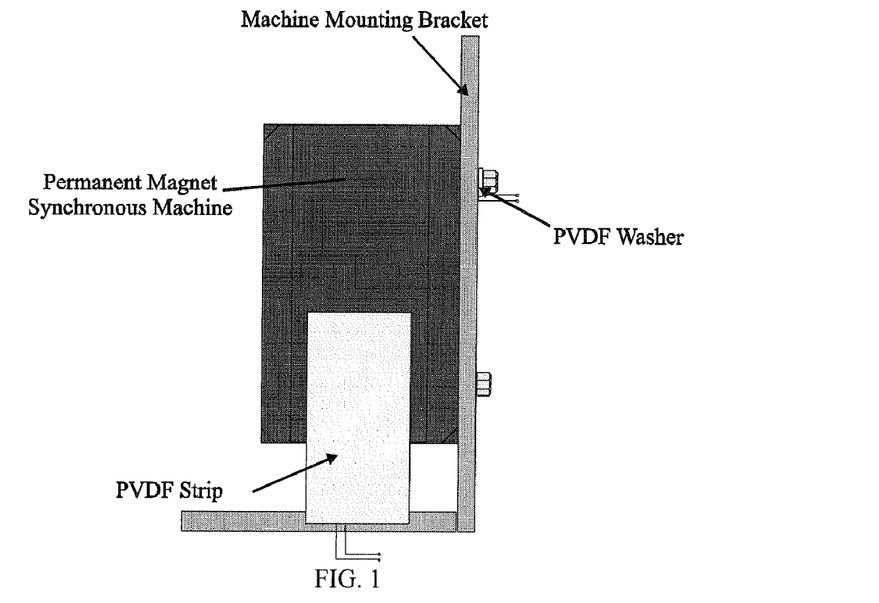
FIG. 1: Torque ripple sensors mounting configurations.

The techniques disclosed herein are demonstrated using the torque ripple mitigation strategy proposed in [26]. Within the strategy, a piezoelectric polyvinylidene fluoride (PVDF) polymer film is used as a sensor to detect torque-ripple-induced vibration. A diagram of possible sensor arrangements is shown in FIG. 1. In [26], the sensor was created using a strip of material stretched between the stator and a fixed point on the motor mount. In subsequent testing across several machine/drive platforms, the washer configuration shown in FIG. 1 has been found to be simpler to construct and implement. All results presented herein are based upon using the washer sensor for vibration feedback. Validation that the output voltage of the washer increases linearly with torque ripple is provided in [27].

The vibration feedback provided by the washer is used to establish stator current harmonics that mitigate the torque ripple. Prior to briefly describing the mitigation algorithm, it is useful to describe the machine used for studies. The machine used is a 3-phase, 12 pole, 3600 RPM machine rated at 13 Nm. The stator windings are wound at full-pitch (one slot/pole/phase) with each slot containing a single phase winding, and the three phases are connected in wye. The rotor magnets are surface mounted. Under this construction, it is assumed that the phase flux can be expressed in a form:

$$\lambda_{as} = L_{asas}i_{as} + L_{asbs}i_{bs} + L_{ascs}i_{cs} + \lambda_{asm} \quad (1)$$

$$\lambda_{bs} = L_{bsas}i_{as} + L_{bsbs}i_{bs} + L_{bscs}i_{cs} + \lambda_{bsm} \quad (2)$$

$$\lambda_{cs} = L_{csas}i_{as} + L_{csbs}i_{bs} + L_{cscs}i_{cs} + \lambda_{csm} \quad (3)$$

where $L_{xsys}$ are the 'x' to 'y' phase mutual inductance and the terms $\lambda_{asm}, \lambda_{bsm}, \lambda_{csm}$ represent the influence of the flux of the permanent magnets on the respective stator windings. These are represented in terms of a Fourier series as:

$$\lambda_{asm} = \lambda_{mag} \sum_{m \in M} \kappa_{em} \sin(m\theta_r) \quad (4)$$

$$\lambda_{bsm} = \lambda_{mag} \sum_{m \in M} \kappa_{em} \sin(m(\theta_r - 120°)) \quad (5)$$

$$\lambda_{csm} = \lambda_{mag} \sum_{m \in M} \kappa_{em} \sin(m(\theta_r + 120°)) \quad (6)$$

where $\kappa_{em}$ is the magnitude of the mth Fourier harmonic coefficient and $\lambda_{mag}$ is a coefficient defined such that $\kappa_{e1}=1$. The set $M=\{m=2x-1: x \in Z^*, \kappa_{em} \neq 0\}$, where $Z^*$ is the set of positive integers and the angle $\theta_r$ represents the electrical rotor position that is defined such that at $\theta_r=0$, no fundamental rotor flux links the as-winding. The 'e' denotes a relationship to the machine back-emf.

A closed-form expression for the electromagnetic torque is established using an energy balance approach [28], which yields:

$$T_e = \frac{P\lambda_{mag}}{2}\left[i_{as}\left(\sum_{m \in M} m\kappa_{em}\cos(m\theta_r)\right) + i_{bs}\left(\sum_{m \in M} m\kappa_{em}\cos(m(\theta_r - 120°))\right) + i_{cs}\left(\sum_{m \in M} m\kappa_{em}\cos(m(\theta_r + 120°))\right)\right] + T_{cog} \quad (7)$$

where P is the number of poles and $T_{cog}$ represents the torque resulting from interaction of the permanent magnets and the stator teeth (cogging torque). Since the machine is designed using an integer number of slots/pole/phase, the cogging torque is a function of the 6th order harmonics of rotor angular position. Mathematically, the cogging torque can be expressed as $$T_{cog} = \sum_{y \in Y} T_{cqy}\cos(y\theta_r) + T_{cdy}\sin(y\theta_r) \quad (8)$$

where $Y=\{y=6x: x \in Z^*, T_{cqy} \neq 0 \cup T_{cdy} \neq 0\}$. It is assumed that the stator currents can be represented in series form as:

$$i_{as} = \sum_{n \in N} \kappa_{iqn}\cos(n\theta_r) + \kappa_{idn}\sin(n\theta_r) \quad (9)$$

$$i_{bs} = \sum_{n \in N} \kappa_{iqn}\cos(n(\theta_r - 120°)) + \kappa_{idn}\sin(n(\theta_r - 120°)) \quad (10)$$

$$i_{cs} = \sum_{n \in N} \kappa_{iqn}\cos(n(\theta_r + 120°)) + \kappa_{idn}\sin(n(\theta_r + 120°)) \quad (11)$$

The set $N=\{n=2x-1, n \neq 3y: x \in Z^*, y \in Z^*, \kappa_{iqn} \neq 0 \cup \kappa_{idn} \neq 0\}$.

Substituting (9)-(11) into (7) and manipulating the final result, the electromagnetic torque may be represented as $$T_e = \overline{T}_e + \sum_{y \in Y} T_{eqy}\cos(y\theta_r) + T_{edy}\sin(y\theta_r) \quad (12)$$

where $$\overline{T}_e = \frac{3P\lambda_{mag}}{4}\sum_{n \in N} \kappa_{en}\kappa_{iqn} \quad (13)$$

represents that average electromagnetic torque produced by the machine, and $$T_{eqy} = \frac{3P\lambda_{mag}}{4}\sum_{n \in N}(\kappa_{e|y-n|} + \kappa_{e|y+n|})\kappa_{iqn} + T_{cqy} \quad (14)$$

$$T_{edy} = \frac{3P\lambda_{mag}}{4}\sum_{n \in N}(\kappa_{e|y-n|} + \kappa_{e|y+n|})\kappa_{idn} + T_{cdy} \quad (15)$$

represent coefficients of the Fourier series of torque ripple expressed in trigonometric form.

TABLE 1

Machine parameters

| $L_{ms}$ = 17.56 uH | $L_{ls}$ = 1.96 uH | $r_s$ = 0.022 Ω |
|---|---|---|
| $\lambda_m$ = 0.0112 Vs | P = 12.0 | $\kappa_{e1}$ = 1.0 |
| $\kappa_{e3}$ = −7.18 · $10^{-2}$ | $\kappa_{e5}$ = 1.05 · $10^{-2}$ | $\kappa_{e7}$ = −9.02 · $10^{-4}$ |
| $\kappa_{e11}$ = 5.95 · $10^{-4}$ | $\kappa_{e13}$ = 1.81 · $10^{-4}$ | $T_{cogq6}$ = 1.2318 Nm |
| $T_{cogd6}$ = 0.0 Nm | $T_{cogq12}$ = 0.2197 Nm | $T_{cogd12}$ = 0.0 Nm |

The parameters of the machine used for the studies described herein are shown in Table 1. Of particular note is that the cogging torque harmonics are significant—as one might expect from a machine that uses unity slot/pole/phase and no skewing of stator teeth or rotor magnets. For control of the ripple components of (14) and (15), the output signal of the sensor shown in FIG. 1 (after some conditioning) is used as the feedback. The output of the sensor is a time-domain signal that contains all of the torque ripple harmonics. In order to extract $T_{eqy}$ and $T_{edy}$, the output voltage of the sensor is multiplied (within the processor) by the sine and cosine functions of the desired torque ripple component. The product is then input into a 'leaky' integrator to extract the desired amplitude. Specifically, $$x_{eqy} = \int [v_{sensor}\cos(y\theta_r) - \epsilon x_{eqy}]dt \quad (16)$$

$$x_{edy} = \int [v_{sensor}\sin(y\theta_r) - \epsilon x_{edy}]dt \quad (17)$$

are voltages that are representative of $T_{eqy}$ and $T_{edy}$, where $v_{sensor}$ is the voltage measured at the DSP.

In [26], a torque ripple mitigation strategy was proposed that determines commanded stator current harmonics based on measured torque ripple harmonics. For implementation of this strategy, a cost function is defined in terms of the machine torque ripple harmonics. The stator current harmonics that minimize the cost function are found using a gradient algorithm [29]. The final algorithm is of the form $$\frac{d}{dt}i_{qh} = -\alpha 2 K_{e1}^T Q x_{eq} \quad (18)$$

$$\frac{d}{dt}i_d = -\alpha 2 K_{e2}^T Q x_{ed} \quad (19)$$

where $x_{eq} \in R^m$ and $x_{ed} \in R^m$ contain the measured torque ripple harmonic coefficients, $i_{qh} \in R^{(n-1)}$ is a vector representing the q-axis current harmonics (not including the fundamental), $i_d \in R^n$ is a vector that represents the d-axis current harmonics, $K_{e1} \in R^{mx(n-1)}$ and $K_{e2} \in R^{mxn}$ contain coefficients of back-emf [scaled by $(0.75P\lambda_{mag})$], $Q \in R^{fxf}$ is a diagonal matrix that contains components to weight overall cost in favor of one harmonic over another, and the scalar α is a control parameter used to adjust the time constant of the controller [29]. The fundamental q-axis current harmonic ($\kappa_{eq1}$) is used to adjust the commanded average torque.

II. Position Observer

Figure 2:
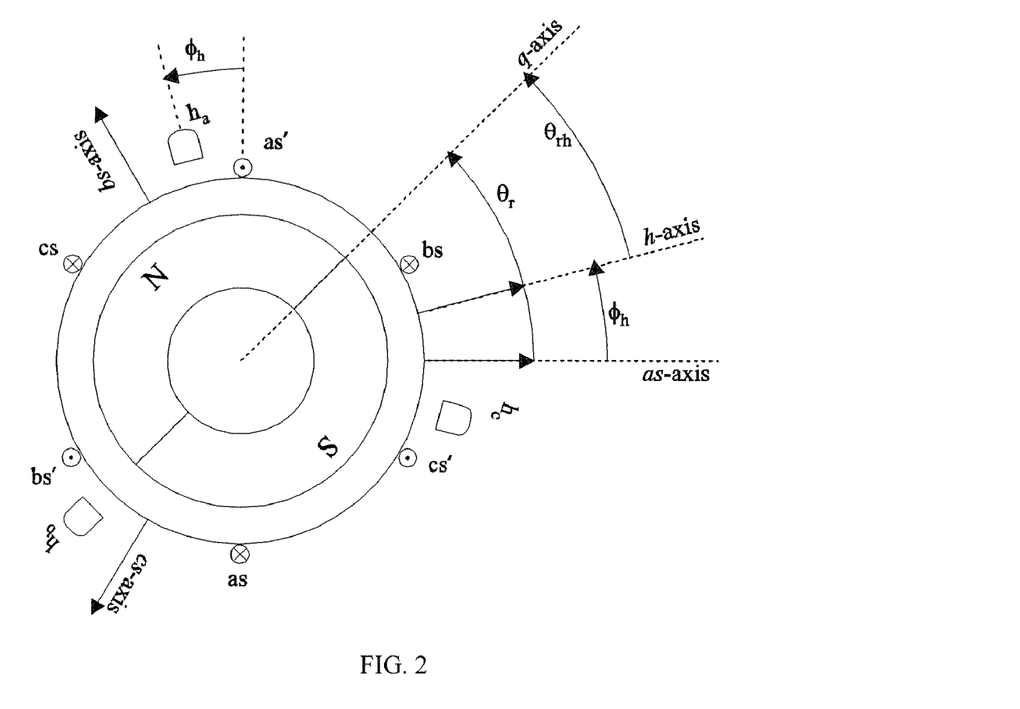
FIG. 2: Diagram of Hall-effect sensor axis and relative rotor positions.

A position observer is used to establish the rotor angle required in (16) and (17). The approach considered herein is similar conceptually to that proposed for control of average torque in [30]. However, significant modifications are required for torque ripple mitigation. Prior to describing the observer, it is useful to define angles and axes used in its derivation. For simplicity, and without lack of generality, position angles are defined using the cross-sectional view of a 2-pole machine shown in FIG. 2. Therein, the angle $$\theta_r = \theta_{rh} + \phi_h \quad (20)$$

is shown where $\theta_r$ is defined as the angle between the q-axis and the as-axis, $\theta_{rh}$ is defined as the angle between the q-axis and the h-axis (herein defined orthogonal to the location of the phase-a Hall-effect sensor), and $\phi_h$ is the angle between the h-axis and the as-axis. In the machine used, the three Hall-effect sensors (labeled ha, hb, and hc) are mounted on the inside of the endplate. Ideally, the sensors are located at π/2, 7π/6, and 11π/6 relative to the h-axis.

Figure 3:
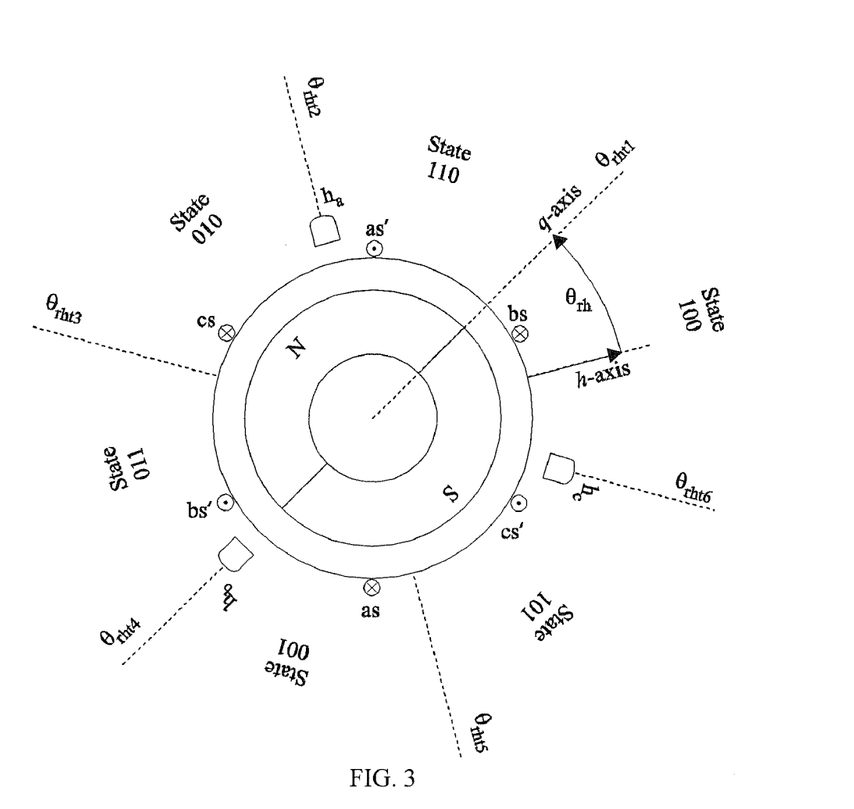
FIG. 3: Diagram of Hall-effect sensor states relative to rotor position ( ).

The new observer utilizes transitions in sensor states to detect position. Ideally, transitions occur at every π/3 interval with the first occurring at π/6 radians relative to the h-axis, as shown in FIG. 3. Transition angles, labeled as $\theta_{rhti}$, relative to sensor states are shown in Table 2.

To estimate the rotor position between state transitions, the angle is updated using $$\theta_{rh} = \int \overline{\omega}_r dt + \theta_{rhti} \quad (21)$$

where $\theta_{rhti}$ is the angle at the 'ith' transition and $\overline{\omega}_r$ is the average rotor angular velocity during the previous Hall-effect sensor state.

TABLE 2

Hall-effect state transition points

| | | | $\theta_{rhti}$ (radian) | |
|---|---|---|---|---|
| ha | hb | hc | Ideal | Measured |
| X | 0 | 1 | 4.71 | 4.74 |
| X | 1 | 0 | 1.57 | 1.54 |
| 0 | X | 1 | 3.67 | 3.51 |
| 1 | X | 0 | 0.52 | 0.60 |
| 0 | 1 | X | 2.62 | 2.65 |
| 1 | 0 | X | 5.76 | 5.91 |

X - denotes sensor in transition

The average rotor speed is determined from $$\bar{\omega}_r = \frac{\Delta\theta_{rh}}{\Delta t} \quad (22)$$

where $\Delta\theta_{rh}$ is the angular displacement of the rotor position over the previous Hall-effect sensor state and $\Delta t$ is the difference in time between transitions.

It can be seen from (21) that if the rotor speed varies between Hall-effect transitions there is error in the estimation of rotor position. To set a maximum limit of error allowed in the calculation, the sensor state in which the rotor is located is used to set the bounds of the integration of (21). These limits are shown in Table 3.

TABLE 3

Hall-effect boundary limits vs. sensor states

| Hall States | | | Boundary Limits (radian) | | | |
|---|---|---|---|---|---|---|
| | | | min($\theta_{rh}$) | | max($\theta_{rh}$) | |
| $h_a$ | $h_b$ | $h_c$ | Ideal | Measured | Ideal | Measured |
| 0 | 0 | 1 | 3.67 | 3.51 | 4.71 | 4.74 |
| 0 | 1 | 0 | 1.57 | 1.54 | 2.62 | 2.65 |
| 0 | 1 | 1 | 2.62 | 2.65 | 3.67 | 3.51 |
| 1 | 0 | 0 | 5.76 | 5.91 | 6.81 | 6.88 |
| 1 | 0 | 1 | 4.71 | 4.74 | 5.76 | 5.91 |
| 1 | 1 | 0 | 0.52 | 0.60 | 1.57 | 1.54 |

It is noted that in Table 2 and Table 3, ideal and measured values have been entered for each state. The ideal values assume that the sensors are spaced exactly $2\pi/3$ radians apart and that each sensor has a 50% duty cycle with respect to rotor position. This is typical of documented research in which Hall-effect sensors are used to obtain rotor position. However, manufacturing tolerances result in offsets in the placement of the sensors and/or the permanent magnets which result in errors in transition angles. As will be shown, such offsets can usually be neglected if the goal is to achieve a commanded average torque. However, it has been found that these errors cannot be neglected if the goal is to mitigate torque ripple.

To demonstrate the effects of error in transition angles, the motor used in hardware studies, whose parameters are shown in Table 1, is simulated using measured Hall-effect sensor transition positions, while the rotor observer of [30] is simulated assuming ideal transitions. The resulting phase-a stator current and torque before and after the implementation of the torque ripple mitigation algorithm are shown in FIG. 4 and FIG. 5.

Figure 4:
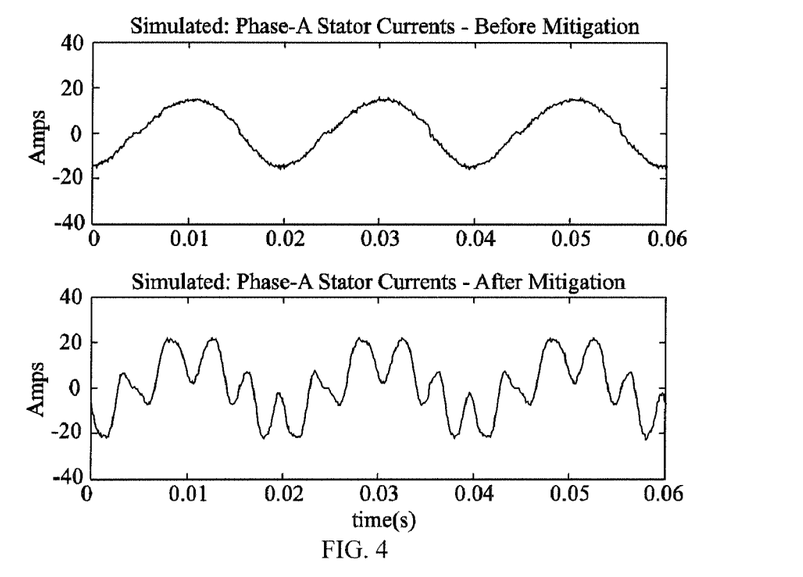
FIG. 4: Simulated phase current before and after implementation of torque ripple mitigation control in which there is error in position observer transition angles.
Figure 5:
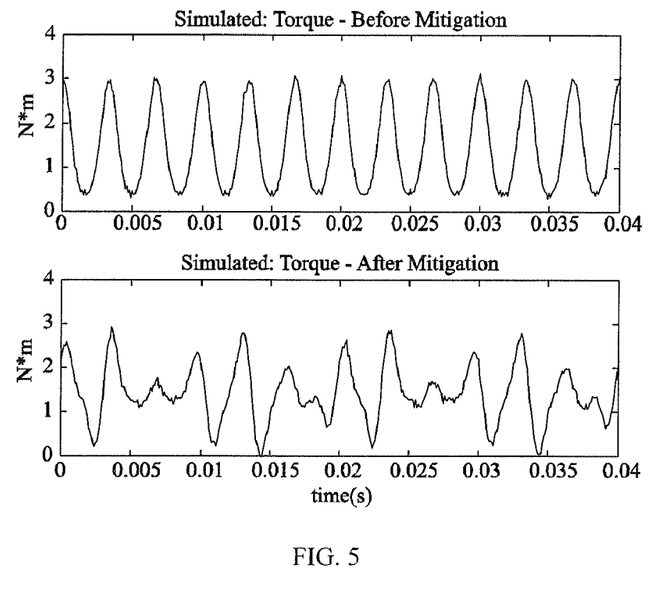
FIG. 5: Simulated torque before and after implementation of torque ripple mitigation control in which there is error in position observer transition angles.

From FIG. 4 and FIG. 5, it can be seen that the average torque is maintained relatively well—despite the error in transitions. Therefore, traditional speed or torque control can be accomplished. However, it is also observed that after implementation of the torque ripple mitigation algorithm large oscillations in the torque remain and seemingly small error in transitions prevents successful mitigation.

To compensate for the non-ideal Hall-effect placement, while maintaining the ease of implementation of the overall control, an automated process is developed to obtain the measured values. As a first step, an additional lookup table is created and used to store the various state values of $\Delta\theta_{rh}$. These are shown in Table 4.

TABLE 4

Hall-effect state transition points

| Transition | | | | $\Delta\theta_{rh}$ (radian) | |
|---|---|---|---|---|---|
| Sensor | $h_a$ | $h_b$ | $h_c$ | Ideal | Measured |
| $h_a$ | 0 | 0 | 1 | −1.05 | −0.86 |
| $h_a$ | 1 | 0 | 1 | 1.05 | 1.23 |
| $h_a$ | 0 | 1 | 0 | 1.05 | 0.94 |
| $h_a$ | 1 | 1 | 0 | −1.05 | −0.98 |
| $h_b$ | 0 | 0 | 1 | 1.05 | 0.86 |
| $h_b$ | 0 | 1 | 1 | −1.05 | −1.11 |
| $h_b$ | 1 | 0 | 0 | −1.05 | −1.16 |
| $h_b$ | 1 | 1 | 0 | 1.05 | 0.98 |
| $h_c$ | 0 | 1 | 0 | −1.05 | −0.94 |
| $h_c$ | 0 | 1 | 1 | 1.05 | 1.11 |
| $h_c$ | 1 | 0 | 0 | 1.05 | 1.16 |
| $h_c$ | 1 | 0 | 1 | −1.05 | −1.23 |

The automated routine is started by implementing an observer wherein the ideal values are stored in the lookup tables (Table 2-4). The motor is then driven using a commanded fundamental component of current. While the motor is running, the time between Hall-effect transitions over a complete electrical cycle is captured. From this information, the values in the lookup tables are recalculated. Iterations over several electrical cycles are performed until a desired tolerance is obtained. A flow chart of the process is shown in FIG. 6.

In testing using a TMS 320C6711 processor, the observer was able to determine a rotor position ±0.1° electrical with respect to the h-axis in approximately 0.1 s. However, it is noted that the accuracy will depend on the sampling frequency of the controller. In testing across multiple machines, it has been observed that an error of less than ±0.7° electrical is needed for effective mitigation control.

Figure 6:
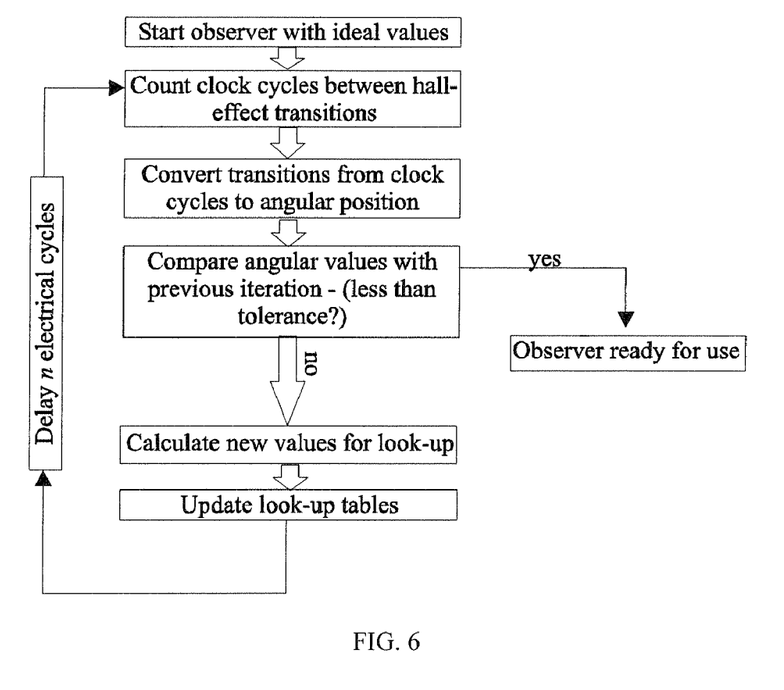
FIG. 6: Flow chart of process used to determine location of the Hall-effect state transitions.

The routine outlined in FIG. 6 establishes the angles needed to compute $\theta_{rh}$. However, for control, the angle $\theta_r$ is required; therefore, the offset angle from the h-axis to the as-axis ($\phi_h$) is required. An approximate value for the angle is sometimes provided by the manufacturer; however, a more precise value is required for ripple mitigation.

To establish $\phi_h$ a calibration routine is operated wherein the commanded phase-a current is set to $$I^*_{as} = I_s \cos(\omega_r t + \phi^*_h) \quad (23)$$

The phase-b and phase-c currents are displaced by 120° and 240° respectively. In (23), $\phi^*_h$ represents an estimate to $\phi_h$.

Under this condition it can be shown that the average torque can be expressed as $$\bar{T}_e = \frac{3P\lambda_{mag}}{4}\kappa_{e1}I^*_s \cos(\phi_h - \phi^*_h) \quad (24)$$

In steady-state, the average rotor speed can be expressed $$\bar{\omega}_r = \frac{3P\lambda_{mag}}{4B_m}\kappa_{e1}I^*_s \cos(\phi_h - \phi^*_h) - \frac{\bar{T}_l}{B_m} \quad (25)$$

where $\bar{T}_l$ is the average load torque applied to the motor and $B_m$ is the damping coefficient.

Figure 7:
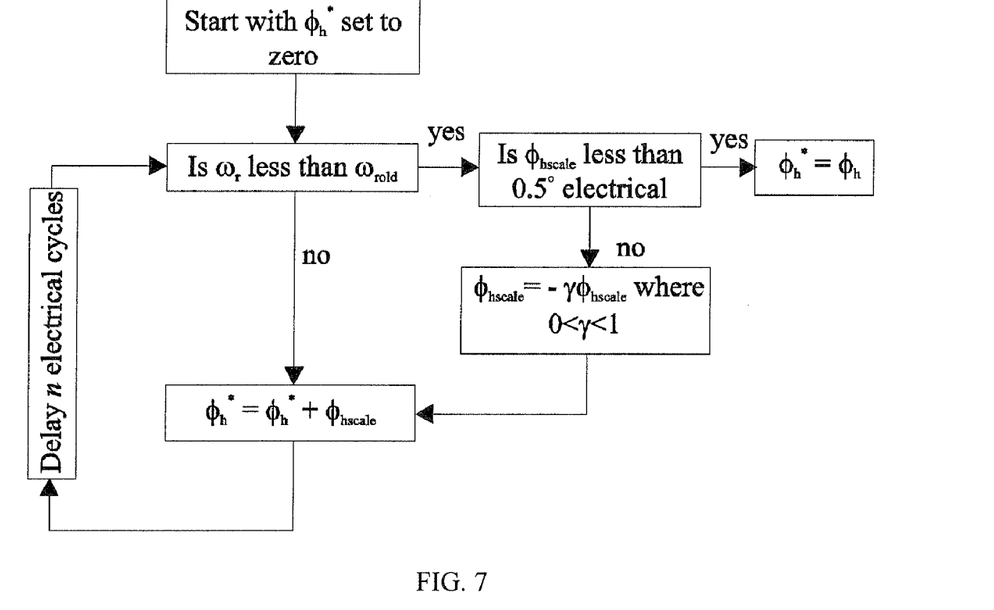
FIG. 7: Flow chart of h-axis offset calculation routine.

From (25), it is noted that the maximum steady state rotor speed occurs when $\phi^*_h = \phi_h$. Therefore, an iterative routine is developed to determine $\phi_h$. To begin, an initial value of the angle is set to $\phi^*_h=0$. The current is applied and a steady-state speed is established. Once a steady-state is established, $\phi^*_h$ is adjusted using $$\phi^*_h=\phi^*_h+\phi_{hscale} \quad (26)$$

where $\phi_{hscale}$ is a fixed value (herein 10° electrical was used). If the rotor speed increases, (26) is repeated. However, if a decrease in rotor speed is detected, the offset angle is modified by $$\phi_{hscale}=-\gamma\phi_{hscale} \quad (27)$$

where $0<\gamma<1$. This process is iterated until $\phi_{hscale}$ is less than 0.5° electrical. The routine is exited and the value of $\phi^*_h$ that yielded the maximum rotor speed is stored. The overall process is shown in FIG. 7.

This iteration determines $\phi_h$ accurately unless $\phi^*_h=\phi_h\pm 90°$. From (25), such an offset will result in zero steady-state rotor speed and no new Hall-effect state transition to update $\phi^*_h$. To avoid the motor stalling with $\phi^*_h$ out of phase, a timer is coupled to determine if the motor has slowed below an acceptable speed. If so, the angle $\phi^*_h$ is shifted 90° and the iteration cycle started at the beginning.

Using a TMS 320C6711 processor, the time required to determine $\phi_h$ has been found to be roughly 5.5 s. Therefore, the combined time of the startup routines (FIG. 6 and FIG. 7) is approximately 5.6 s for the motor used in the experimental validation. It is important to note that these routines only need to be performed once as part of an initial commissioning, since the values of Hall-effect transitions and $\phi_h$ remain unchanged for the life of the drive.

Figure 8:
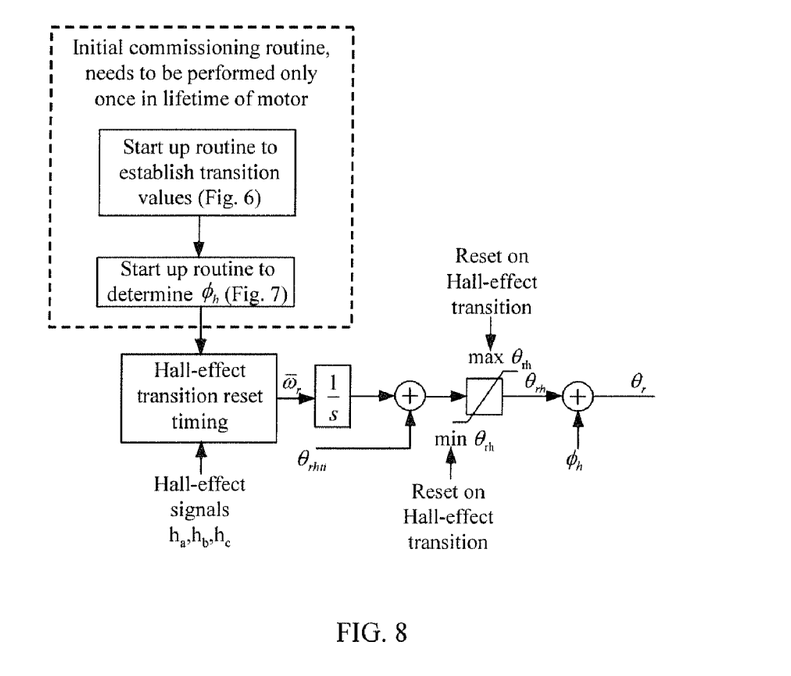
FIG. 8: Block diagram of position observer.

The position observer developed is able to accurately track rotor position despite poor placement of Hall-effect sensors and is able to align itself relative to the as-axis. For startup, the rotor is assumed to be in the middle of the present Hall-effect state to minimize the initial error in rotor position. This position is calculated by taking the average of the max and min values of $\theta_{rh}$ from Table 3 for the corresponding state. For the first transition, the average rotor speed is halved (since the machine is assumed to be located midway between transitions). A block diagram of the overall position observer is shown in FIG. 8.

III. Compensating for Delay

In testing of the washer in multiple settings, it has been found that sensor delay can be appreciable. Herein, an update to the control in [26] that compensates for sensor delay is presented.

Figure 9:
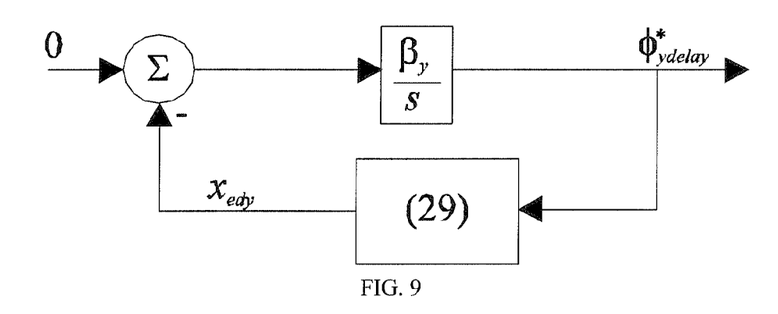
FIG. 9: Diagram of method used to establish the value of sensor delay.

For a large majority of PMSMs with $\theta_r$ defined as shown in FIG. 2, $T_{edy}$ will be zero provided that the d-axis current amplitudes are set to zero. In such cases, the measured d-axis component of torque ripple ($x_{edy}$) provides a means to determine the sensor delay. Specifically, as a first step the calculation of (16) and (17) are replaced by $$x_{eqy}=\int[v_{sensor}\cos(y\theta_r-\phi^*_{ydelay})-\epsilon x_{eqy}]dt \quad (28)$$

$$x_{edy}=\int[v_{sensor}\sin(y\theta_r-\phi^*_{ydelay})-\epsilon x_{edy}]dt \quad (29)$$

where $\phi^*_{ydelay}$ is the estimated sensor delay of the 'yth' ripple harmonic. Knowing that $x_{edy}=0$ when $\phi^*_{ydelay}=\phi_{ydelay}$, a simple integral control is used to determine $\phi_{ydelay}$. A block diagram is shown in FIG. 9.

From FIG. 9, it can be seen that the estimated delay is calculated using $$\phi^*_{ydelay}=\int\beta_y x_{edy}dt \quad (30)$$

where $\beta_y$ is a user-defined integration constant that is chosen so that the integration response of $\phi^*_{ydelay}$ is slower than that of the response of (28) and (29). The integration stops only when $x_{edy}=0$. From (29) it can be seen that multiple values of $\phi^*_{ydelay}$ can yield $x_{edy}=0$. However, it can be shown that only $\phi^*_{ydelay}=\phi_{ydelay}$ yields a solution that will maintain a steady-state value of $x_{edy}=0$ (i.e. others represent unstable operating points).

Figure 10:
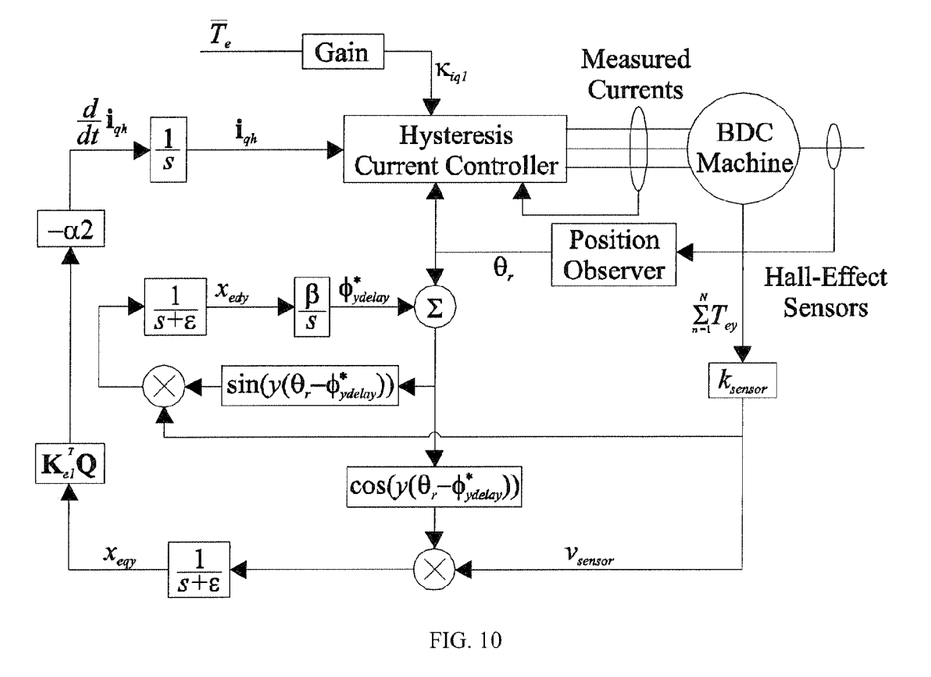
FIG. 10: Diagram of the torque ripple mitigation controller with position observer and vibration sensor delay compensation.
Figure 11:
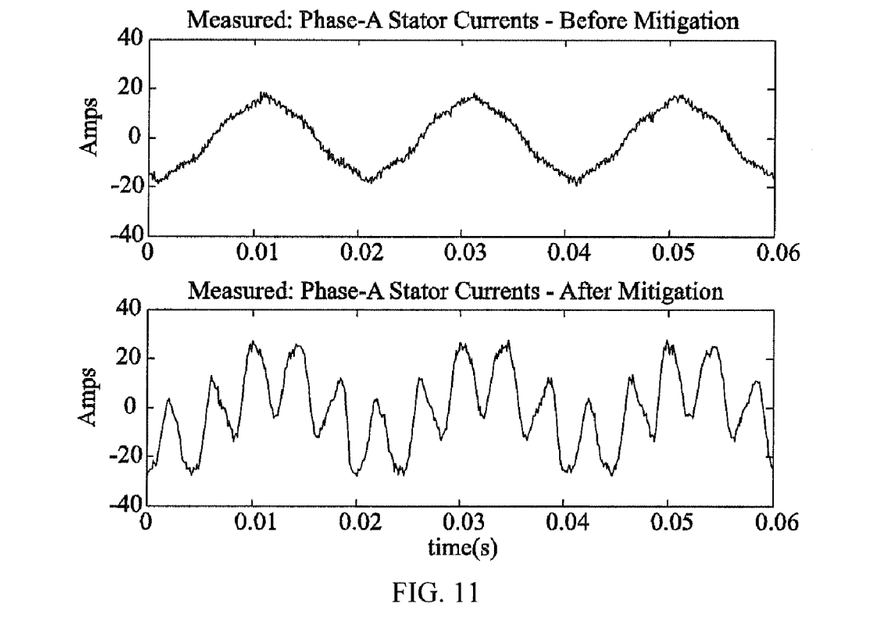
FIG. 11: Measured phase current before and after implementation of torque ripple mitigation control.
Figure 12:
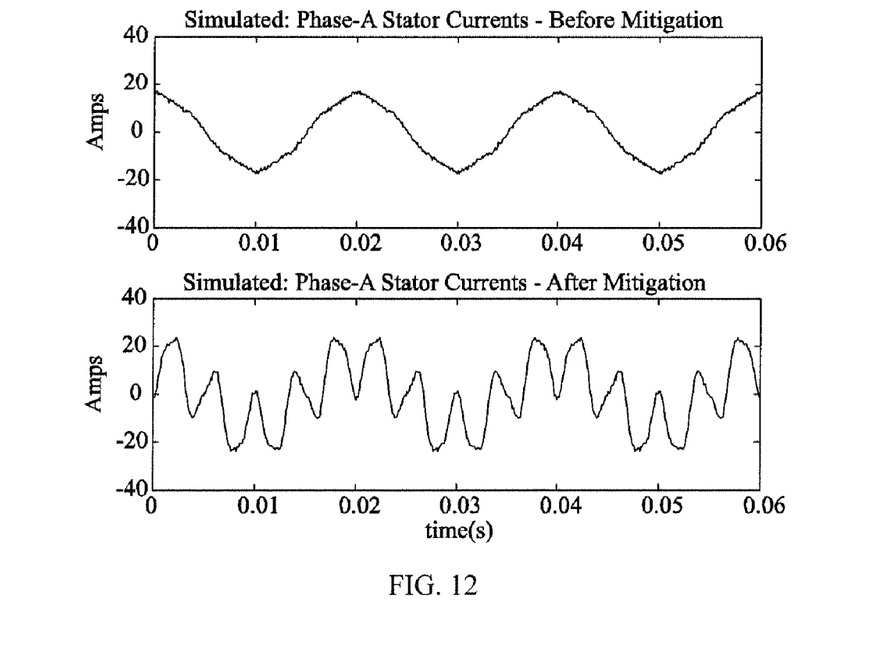
FIG. 12: Simulated phase current before and after implementation of torque ripple mitigation control.
Figure 13:
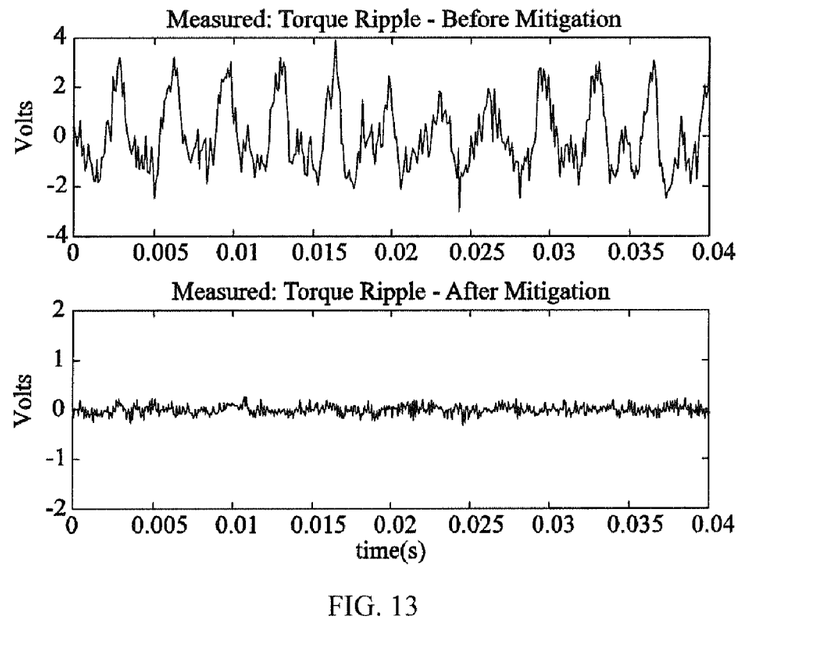
FIG. 13: Measured torque ripple before and after implementation of torque ripple mitigation control.
Figure 14:
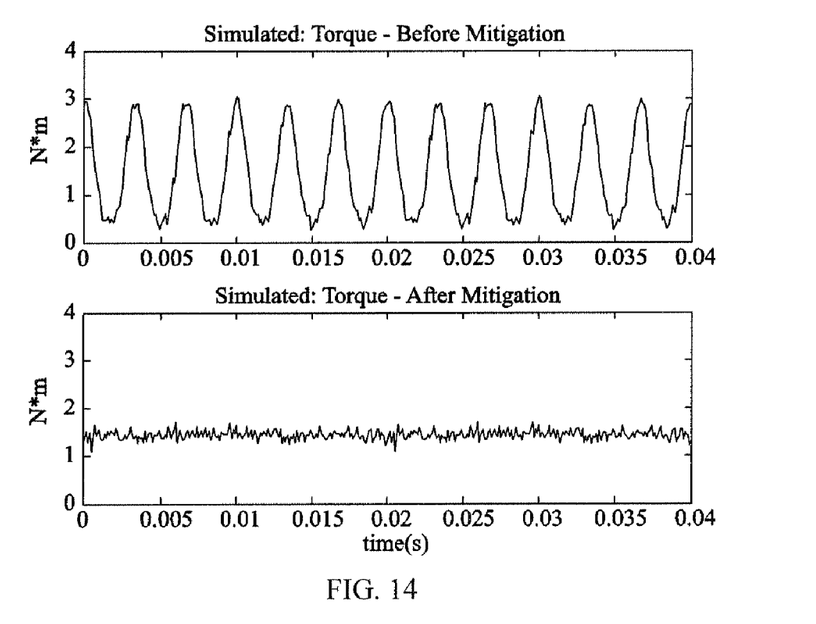
FIG. 14: Simulated torque before and after implementation of torque ripple mitigation control.

For this torque ripple mitigation control with sensor delay, the d-axis stator current harmonics are set to zero to maintain a zero d-axis torque component, and the q-axis stator currents are controlled by (18) to eliminate torque ripple. The fundamental q-axis harmonic is used to control an average rotor speed or torque. A block diagram depicting the mitigation controller with sensor delay compensation is shown in FIG. 10.

For applications in which $T_{edy}$ is nonzero; for example when the d-axis current is applied to achieve flux weakening, the scheme proposed in (30) is not applicable. Instead, an extra step in the observer commissioning routine shown in FIG. 8 can be used to determine delay. Specifically, with the rotor at standstill, the commanded stator currents are set to $$i^*_{as}=I_s\cos(\omega_e t) \quad (31)$$

$$i^*_{bs}=-I_s\cos(\omega_e t) \quad (32)$$

$$i^*_{cs}=0 \quad (33)$$

Under (31)-(33), the electromagnetic torque can be expressed as $$T_e=K\cos(\omega_e t)+T_{cog}(\theta_{r0}) \quad (34)$$

where $\theta_{r0}$ is the arbitrary rotor position at which excitation occurs, and $$K=I_s\left[\frac{\partial\lambda_{as}}{\partial\theta_r}-\frac{\partial\lambda_{bs}}{\partial\theta_r}\right]\bigg|_{\theta_r=\theta_{r0}} \quad (35)$$

is a constant that depends upon the initial rotor position. The resulting sensor voltage can be expressed:

$$v_{sensor}=K_2\cos(\omega_e t+\phi_{delay}) \quad (36)$$

where $K_2$ is a constant that is dependent upon stator current amplitude, rotor position, and mount dynamics. $\phi_{delay}$ is readily determined by the phase angle of the sensor voltage. In practice, the delay angle would need to be determined for all frequencies of interest, which could require a relatively long commissioning time. However, once delay angles are known, they would be stored for subsequent drive operation. It is also noted, that if the initial rotor angle is such that (35) is zero, alternative phases can be excited to ensure torque ripple is created under the stator excitation.

IV. Results

For hardware validation of the position observer and delay compensation, the PMSM whose parameters are shown in Table 1 was used. Prior to describing the experimental results, it is useful to provide some background on the machine and hardware setup. The machine used to test is commercially available and marketed for use in hybrid cycles. The inverter used was built in-house and uses 30A/600V IGBTs operating under hysteresis control. The rated switching frequency of the devices is 40 kHz. Due to the relatively low inductance of the machine, 0.4 mH inductors were placed in series with the stator phase windings to facilitate current based switching regulation using an IGBT drive. Although the machine is rated at 5 kW at 3600 RPM, the laboratory power supply available limited testing to 2 Nm at 500 RPM. Testing at light load does not reflect a limitation of the proposed methods. In commercial applications, the primary constraint of the proposed method is the bandwidth provided by the processor. Specifically, processing power will limit the number of current harmonics that can be controlled which translates into the harmonics of torque that can be eliminated. In addition, the maximum frequency of the harmonic current that can be controlled will be roughly a decade below the sampling rate of the DSP.

A floating point TMS 320C6711 DSP was used for the position observer and torque ripple mitigation control. The position observer and torque ripple mitigation algorithm were programmed using the C++ language format. The mitigation control was implemented to monitor two torsional harmonics and manipulate three current harmonics. Specifically the controller was such that $\epsilon_{iq1}$ was used to track an average commanded torque, while mitigation of the 6th and 12th torque ripple induced harmonics was accomplished using $$\frac{d}{dt}\begin{bmatrix} \kappa_{iq5} \\ \kappa_{iq11} \end{bmatrix} = -\alpha 2 \begin{bmatrix} \kappa_{e1}+\kappa_{e11} & \kappa_{e7} \\ \kappa_{e5} & \kappa_{el} \end{bmatrix}\begin{bmatrix} q_{11} & 0 \\ 0 & q_{22} \end{bmatrix}\begin{bmatrix} x_{eq6} \\ x_{eq12} \end{bmatrix} \quad (37)$$

and the d-axis current harmonics were set to zero to maintain a zero d-axis torque ripple.

It is noted that for ripple control the 11th current harmonic was chosen over the 7th current harmonic, since it has a greater influence on the 12th torque harmonic. Specifically, the relation between the 12th torque ripple harmonic and harmonics of stator current can be shown to have a relation $$T_{e12q} \propto \kappa_{e5}\kappa_{eq7} \quad (38)$$

$$T_{e12q} \propto \kappa_{e1}\kappa_{iq11} \quad (39)$$

Since $K_{e1} \gg K_{e5}$ it can be shown using (14) that $\kappa_{iq11}$ has a much greater influence on $T_{e12q}$ than $\kappa_{iq7}$. It is also noted that at higher loads closer to rated, magnetic saturation may occur and introduce operating-point dependent back-emf coefficients. To mimic the effects saturation would have on the proposed approach, a randomness was introduced into the back-emf coefficients defined in the controller (37). Specifically, within the controller each of the back-emf coefficients (which in this case were known and are shown in Table 1) was multiplied by a different random number between 0.1 and 0.5. It is important to note that saturation can have an effect on cogging torque amplitude. However, a convenience of the torque ripple mitigation control proposed is that knowledge of the cogging torque amplitude is not required.

For the first test case, the commanded torque to the drive was set to 1.5 Nm. Prior to mitigation, $\kappa_{iq1}$, $\kappa_{iq5}$, and $\kappa_{iq11}$ were adjusted to achieve the commanded average torque with a minimum rms current (i.e. maximum torque/amp) [4]. Results of a time-domain simulation of the drive are provided for comparison. Within the drive system model, the control algorithm was simulated using the sampling interrupts that are present within the DSP implementation.

Results of the current and torque harmonics before and after the mitigation control are shown in FIG. 11-14. The currents shown in FIG. 11 were obtained using a Tektronix A6303 current probe/Tektronix AM 503A current probe amplifier. The sensor voltage shown in FIG. 13 was measured at the input of the DSP using an HP 1160A 10:1 voltage probe, and captured using an HP infinium 54815A oscilloscope.

Figure 15:
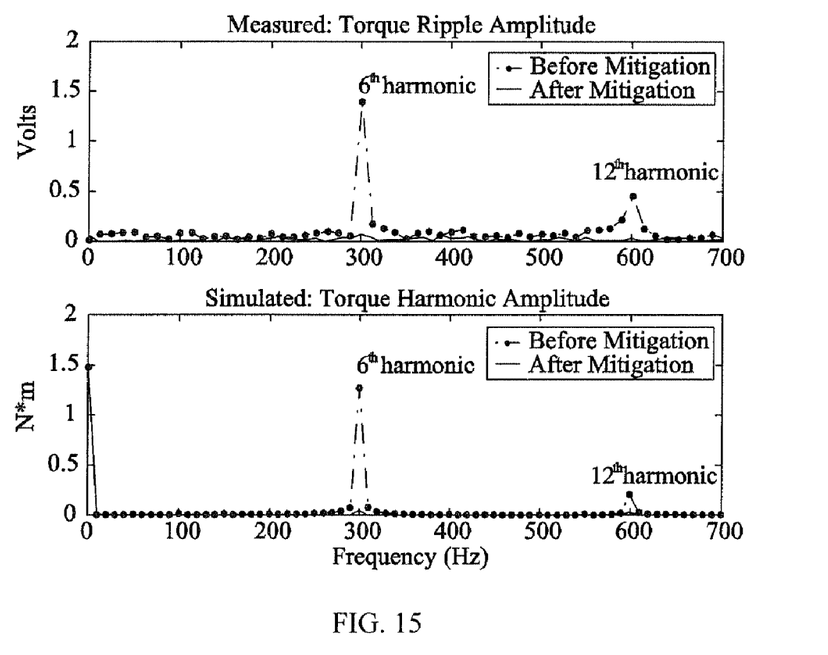
FIG. 15: Frequency domain of torque ripple sensor (Measured) and the torque (Simulated) before and after implementation of torque ripple mitigation control.

Viewing measured and simulated responses after the ripple mitigation control was executed, it is seen that a significant 5th and some 11th harmonic is present in the stator current waveform and the 6th and 12th harmonic of torque ripple was greatly reduced. The large harmonics in the current are due to the relatively large values of cogging torque that are found in the machine studied. For further insight into the controller effectiveness, a frequency domain plot of the torque ripple was obtained for both the simulation and hardware tests and is shown in FIG. 15. The frequency domain plot shows the substantial reduction in ripple—the magnitude of 6th torque ripple harmonic and the 12th harmonic were close to the noise floor after the control was applied.

To determine the response time of the system for a load change, the same system above is implemented with the mitigation controller in steady-state. A step change in commanded load torque from 1.25 Nm to 2.0 Nm is then applied. The measured current and torque ripple during the transition are shown in FIG. 16-17.

Figure 16:
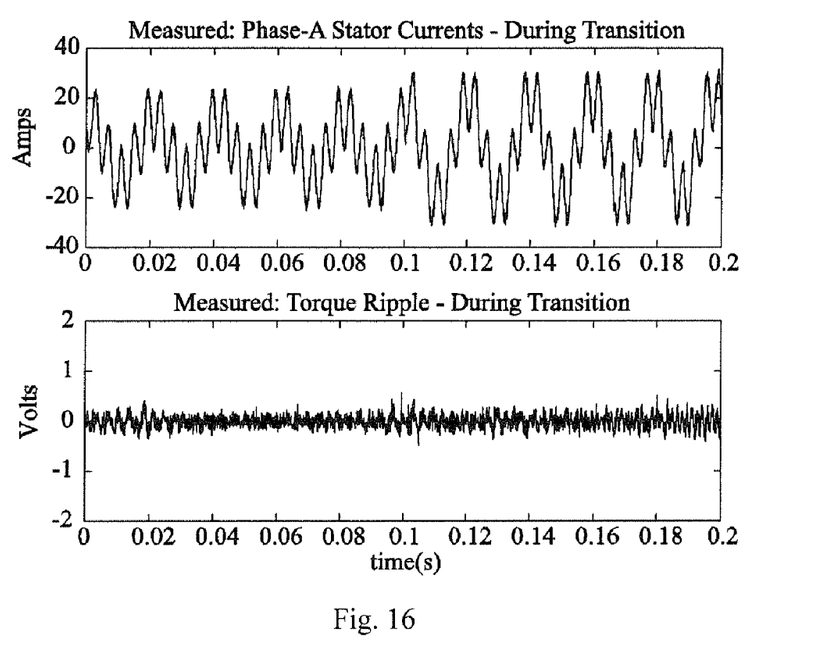
FIG. 16: Measured current and torque ripple during a step change in average torque.
Figure 17:
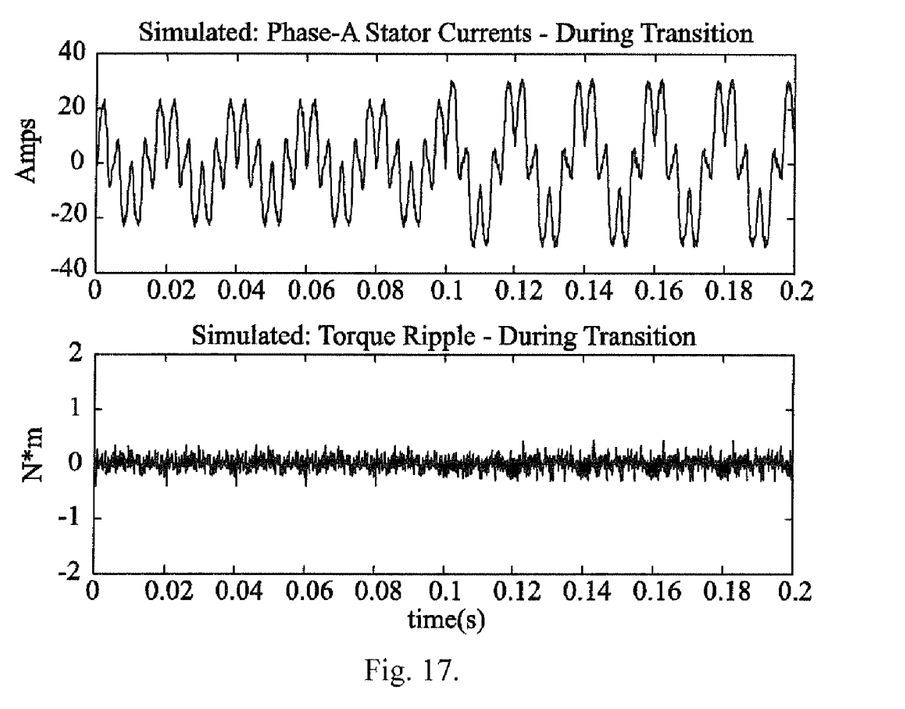
FIG. 17: Simulated current and torque ripple during a step change in average torque.

From FIG. 16 and FIG. 17, it can be seen that the system achieves a steady-state quickly after the transient and that there is negligible torque ripple before and after the transient.

V. Conclusions

Torque ripple mitigation without the use of a high precision position encoder has been achieved in a hardware setup. This is accomplished using a new Hall-effect position observer. The observer includes a commissioning routine to determine the exact location of Hall-effect transitions, despite errors in sensor and/or magnet placement. To further enhance the mitigation control used, compensation of sensor delay is added to the torque ripple mitigation algorithm. The results point to the applicability of utilizing control-based methods to mitigate torque ripple in mass-produced drive systems.

While the invention has been illustrated and described in detail in the drawings and foregoing description, the same is to be considered as illustrative and not restrictive in character, it being understood that only preferred embodiments have been shown and described and that all changes and modifications that come within the spirit of the invention are desired to be protected.

The following paper is incorporated herein by reference along with all references cited therein: Steve Pekarek and Philip Beccue, "Using Torque-Ripple-Induced Vibration to Determine the Initial Rotor Position of a Permanent Magnet Synchronous Machine," *IEEE Transactions on Power Electronics*, Vol. 21, No. 3, May 2006, pp. 818-821. The following references are also incorporated herein by reference:

References

[1] H. Le-Huy, R. Perret, and R. Feuillet, "Minimization of torque ripple in brushless DC motor drives," *IEEE Transactions on Industry Applications*, Vol. 22, No. 4, pp. 803-813, July/August 1986.

[2] C. Kang and I. Ha, "An efficient torque control algorithm for BLDCM with a general shape back-emf," *PESC Record-Power Electronics Specialists Conference*, 1993, pp. 451-457.

[3] D. C. Hanselman, "Minimum torque ripple, maximum efficiency excitation of brushless permanent magnet motors," *IEEE Transactions on Industrial Electronics*, Vol. 41, No. 3, pp. 292-300, June 1994.

[4] R. Leidhold, G. Garcia, and E. Watanabe, "PMAC motor control strategy, based on the instantaneous active and reactive power, for ripple-torque and copper-losses minimization," *IEEE Proceedings from the Industrial Electronics Society Conference*, October 2000, pp. 1401-1405.

[5] S. Park, H. Park, M. Lee, and F. Harashima, "A new approach for minimum-torque ripple maximum-efficiency control of BLDC motor," *IEEE Transactions on Industrial Electronics*, Vol. 47, No. 1, pp. 109-114, February 2000.

[6] C. D. Angelo, G. Bossio, G. Garcia, J. Solsona, and M. I. Valla, "Sensorless speed control of permanent magnet motors with torque ripple minimization," *IEEE proceedings from the Industrial Society Annual Conference*, November 2002, pp. 680-685.

[7] P. L. Chapman, S. D. Sudhoff, and C. A. Whitcomb, "Optimal current control strategies for surface-mounted permanent-magnet synchronous machine drives," *IEEE Transactions on Energy Conversion*, Vol. 14, No. 4, pp. 1043-1050, December 1999.

[8] A. Wu and P. Chapman, "Cancellation of torque ripple due to nonidealities of permanent magnet synchronous machine drives," *IEEE Proceedings from the Power Electronics Specialist Conference*, June 2003, pp. 256-261.

[9] J. Holtz and L. Springob, "Identification and compensation of torque ripple in high-precision permanent magnet motor drives," *IEEE Transactions on Industrial Electronics*, Vol. 43, No. 2, pp. 309-320, April 1996.

[10] S. Chen, A. Song, and T. Sekiguchi, "High efficiency and low torque ripple control of permanent magnet synchronous motor based on the current tracking vector of electromotive force," *IEEE Proceedings from the Industrial Applications Conference*, October 2000, pp. 1725-1729.

[11] J. Hung and Z. Ding, "Design of currents to reduce torque ripple in brushless permanent magnet motors," *IEE Proceedings Part B from Electric Power Applications*, Vol. 140, No. 4, pp. 260-266, July 1993.

[12] S. Clenet, Y. Lefévre, N. Sadowski, S. Astier, and M. Lajoie, "Compensation of permanent magnet motors torque ripple by means of current supply waveshapes control determined by finite element method," *IEEE Transactions on Magnetics*, Vol. 29, No. 2, pp. 2019-2023, March 2003.

[13] T. Liu, I. Husain, and M. Elbuluk, "Torque ripple minimization with on-line parameter estimation using neural networks in permanent magnet synchronous motors," *IEEE Proceedings from the Industry Applications Conference*, October 1998, pp. 35-40.

[14] T. S. Low, K. J. Tseng, T. H. Lee, K. W. Lim, and K. S. Lock, "Strategy for the instantaneous torque control of permanent-magnet brushless DC drives," *IEE Proceedings Part B from Electric Power Applications*, Vol. 137, No. 6, November 1990, pp. 355-363.

[15] N. Matsui, T. Makino, and H. Satoh, "Autocompensation of torque ripple of direct drive motor by torque observer," *IEEE Transactions on Industry Applications*, Vol. 29, No. 1, pp. 187-194, January/February 1993.

[16] T. Low, T. Lee, K. Tseng, and K. Lock, "Servo performance of a BLDC drive with instantaneous torque control," *IEEE Transactions on Industrial Applications*, Vol. 28, No. 2, pp. 455-462, March/April 1992.

[17] G. Ferretti, G. Magnani, and P. Rocco, "Torque ripple adaptive rejection in brushless motors," *IEEE/ASME Proceedings from the International Conference on Advanced Intelligent Mechatronics*, September 1999, pp. 329-334.

[18] F. Colamartino, C. Marchand, and A. Razek, "Considerations of non-sinusoidal field distribution in a permanent magnet synchronous motor control," *IEE Proceedings from the Power Electronics and Variable-Speed Drives Conference*, October 1994, pp. 508-513.

[19] S. Li, Z. Zhizhong, and L. Yongping, "Compensation of ripple torque of inverter-fed PM synchronous motors," *IEEE Proceeding from the American Control Conference*, June 2000, pp. 1597-1601.

[20] F. Parasiliti, R. Petrella, and M. Tursini, "Torque ripple compensation in permanent magnet synchronous motors based on Kalman Filter," *IEEE Proceedings from International Industrial Electronics*, July 1999, pp. 1333-1338.

[21] F. Colamartino, C. Marchand, and A. Razek, "Torque ripple minimization in a permanent magnet synchronous servodrive," *IEEE Transactions on Energy Conversion*, Vol. 14, No. 3, pp. 616-621, September 1999.

[22] O. Bogosyan, M. Gokasan, and A. Sabanovic, "Robust-adaptive linearization with torque ripple minimization for a PMSM driven single link arm," *IEEE Proceedings from the International Conference on Industrial Electronics, Control, and Instrumentation*, November 1997, pp. 102-107.

[23] V. Petrovic, R. Ortega, A. M. Stankovic, and G. Tadmor, "Design and implementation of an adaptive controller for torque ripple minimization in PM synchronous motors," *IEEE Transactions on Power Electronics*, Vol. 15, No. 5, pp. 871-880, September 2000.

[24] W. Qian, S. Panda, and J. Xu, "Torque ripple minimization in PM synchronous motors using iterative learning control," *IEEE Transactions on Power Electronics*, Vol. 19, No. 2, pp. 272-279, March 2004.

[25] T. Su, S. Hattori, M. Ishida, and T. Hori, "Suppression control method for torque Vibration of AC motor utilizing repetitive controller with Fourier transform," *IEEE Transactions on Industry Applications*, Vol. 38, No. 5, pp. 1316-1325, September/October 2002.

[26] P. Beccue, J. Neely, S. Pekarek, and D. Stutts, "Measurement and control of torque ripple-induced frame torsional vibration in a surface mount permanent magnet machine," *IEEE Transactions on Power Electronics*, Vol. 20, No. 1, pp. 182-191, January 2005.

[27] P. Beccue, J. Neely, S. Pekarek, and D. Stutts, "Utilization of a piezoelectric polymer to sense harmonics of electromagnetic torque," *IEEE Power Electronics Letters*, Vol. 1, No. 3, pp. 69-73, September 2003.

[28] P. C. Krause, O. Wasynczuk, and S. D. Sudhoff, *Analysis of Electric Machinery*, IEEE Press, 1995.

[29] S. Zak and E. Chong, *An Introduction to Optimization*, Wiley, 1996.

[30] K. A. Corzine and S. D. Sudhoff, "A hybrid observer for high performance brushless DC motor drives," *IEEE Transaction on Energy Conversion*, Vol. 11, No. 2, pp. 318-323, June 1996.

We claim:

1. A method of reducing torque ripple in a rotational electromagnetic motor, the method comprising:
utilizing a force sensor to sense rotational reaction forces produced by the motor due to torque ripple;
generating a sensor signal correlating to an amplitude of said rotational reaction forces;
processing said sensor signal to produce a control signal including commanded current harmonics;
supplying said control signal to a current controller of the motor to reduce the torque ripple;
determining force sensor delay between the torque ripple and the resulting reaction forces; and
adjusting said control signal to compensate for the sensor delay.

2. The method of claim 1, wherein the force sensor delay is calculated by integrating a measured component of torque ripple.

3. The method of claim 2, wherein said processing step comprises:
   correlating said sensor signal with functions of harmonics to determine torque harmonic values;
   filtering said torque harmonic values;
   defining a cost function in terms of torque ripple based on said filtered harmonic values; and
   minimizing said cost function to produce current for minimizing the torque ripple.

4. The method of claim 2, wherein the amplitude and/or phase angle of at least one selected harmonic of torque ripple is used to determine the force sensor delay.

5. The method of claim 4, wherein the calculation of force sensor delay includes integrating the value of at least one selected harmonic of torque ripple.

6. The method of claim 5, wherein said measured component of torque ripple is a d-axis component.

7. The method of claim 6, wherein the calculation of sensor delay includes obtaining an estimated delay $\phi^*_{ydelay}$, the estimated delay of the $y^{th}$ ripple harmonic, $$\phi^*_{ydelay} = \int \beta_y x_{edy} dt$$

where $x_{edy}$ is representative of $T_{edy}$, the d-axis component of torque ripple, where $\beta_y$ is an integration constant, and where $$x_{edy} = \int [v_{sensor} \sin(y\theta_r - \phi^*_{ydelay}) - \epsilon x_{edy}] dt$$

where $v_{sensor}$ is the output voltage of said sensor, $\theta_r$ is the electrical rotor position of said motor, and $\epsilon$ is a user-defined time constant.

8. The method of claim 7, wherein said processing includes setting a commanded d-axis stator current harmonic substantially to zero, and using a q-axis stator current harmonic to control torque ripple, and wherein the measured d-axis torque harmonic is used to determine sensor delay.

9. The method of claim 8, wherein said processing step comprises:
   correlating said sensor signal with functions of harmonics to determine torque harmonic values;
   filtering said torque harmonic values;
   defining a cost function in terms of torque ripple based on said filtered torque harmonic values; and
   minimizing said cost function to produce current for minimizing the torque ripple.

10. The method of claim 1, wherein sensor delay is determined by the phase angle of the sensor voltage with the rotor at standstill.

11. The method of claim 10, wherein said processing step comprises:
    correlating said sensor signal with functions of harmonics to determine torque harmonic values;
    filtering said torque harmonic values;
    defining a cost function in terms of torque ripple based on said filtered torque harmonic values; and
    minimizing said cost function to produce current for minimizing the torque ripple.

12. The method of claim 11, wherein said processing includes setting a commanded first-axis stator current harmonic substantially to zero, and using a second-axis stator current harmonic to control torque ripple, wherein the measured first-axis torque harmonic is used to determine sensor delay, and wherein said first axis is one of the d axis and the q axis, and said second axis is the other of the d axis and the q axis.

13. The method of claim 1, wherein said force sensor is responsive to torque-ripple-induced vibration.

14. The method of claim 13, wherein said force sensor is a piezoelectric sensor.

15. A closed-loop torque ripple mitigation controller for a permanent magnet synchronous machine having a rotor and stator, comprising:
    a sensor of rotational reaction forces produced by said machine due to torque ripple, said sensor generating a feedback signal correlating to an amplitude of said rotational reaction forces;
    a control circuit having an input connected to said sensor and an output connected to said stator of said machine, said control circuit configured to adjust the current supplied to said stator to reduce the torque ripple, said control circuit further including a sensor delay compensation circuit.

16. The controller of claim 15, wherein said sensor delay compensation circuit is configured to calculate the value of at least one amplitude and/or phase angle of a torque ripple component.

17. The controller of claim 16, wherein said sensor delay compensation circuit includes an integrator configured to calculate sensor delay by integrating a measured component of torque ripple.

18. The controller of claim 17, wherein said integrator integrates at least one selected harmonic of torque ripple.

19. The controller of claim 18, wherein said measured component of torque ripple is a d-axis component.

20. The controller of claim 19, wherein said sensor delay compensation circuit obtains an estimated delay $\phi^*_{ydelay}$, the estimated delay of the $y^{th}$ ripple harmonic, $$\phi^*_{ydelay} = \int \beta_y x_{edy} dt$$

where $x_{edy}$ is representative of $T_{edy}$, the d-axis component of torque ripple, where $\beta_y$ is an integration constant, and where $$x_{edy} = \int [v_{sensor} \sin(y\theta_r - \phi^*_{ydelay}) - \epsilon x_{edy}] dt$$

where $v_{sensor}$ is the output voltage of said sensor, $\theta_r$ is the electrical rotor position of said machine, and $\epsilon$ is a time constant.

21. The controller of claim 20, wherein said control circuit sets a commanded d-axis stator current harmonic substantially to zero, uses a q-axis stator current harmonic to control torque ripple, and uses the measured d-axis torque harmonic to determine sensor delay.

22. The controller of claim 21, wherein said control circuit includes a processor configured to correlate said feedback signal with functions of harmonics to determine torque harmonic values, filter said torque harmonic values, define a cost function in terms of torque ripple based on said filtered torque harmonic values, and minimize said cost function to produce current for minimizing the torque ripple.

23. The controller of claim 15, wherein said sensor delay compensation circuit is configured to use the phase angle of the sensor voltage with the rotor at standstill to determine sensor delay.

24. The controller of claim 23, wherein said control circuit sets a commanded first-axis stator current harmonic substantially to zero, uses a second-axis stator current harmonic to control torque ripple, and uses the measured first-axis torque harmonic to determine sensor delay, and wherein said first axis is one of the d axis and the q axis, and said second axis is the other of the d axis and the q axis.

25. The controller of claim 24, wherein said control circuit includes a processor configured to correlate said feedback signal with functions of harmonics to determine torque harmonic values, filter said torque harmonic values, define a cost function in terms of torque ripple based on said filtered torque harmonic values, and minimize said cost function to produce current for minimizing the torque ripple.

26. The controller of claim 15, wherein said sensor is responsive to torque-ripple-induced vibration.

27. The controller of claim 26, wherein said sensor is a piezoelectric sensor.

\* \* \* \* \*